United States Patent [19]
Sprankle

[11] 3,751,673
[45] Aug. 7, 1973

[54] ELECTRICAL POWER GENERATING SYSTEM

[76] Inventor: Roger S. Sprankle, 2051 Woodlyn Rd., Pasadena, Calif.

[22] Filed: July 23, 1971

[21] Appl. No.: 165,536

[52] U.S. Cl. .................... 290/52, 418/201, 60/26, 290/2
[51] Int. Cl. ............................................ H02k 7/18
[58] Field of Search .................................. 60/26; 418/201–203; 290/52, 2, 1

[56] References Cited
UNITED STATES PATENTS

| | | | |
|---|---|---|---|
| 3,274,769 | 9/1966 | Reynolds | 60/26 |
| 3,437,263 | 4/1969 | Persson | 418/202 |
| 3,140,986 | 7/1964 | Hubbard | 60/26 |
| 2,369,539 | 2/1945 | Delamere | 418/203 |
| 3,470,943 | 10/1969 | Van Huisen | 60/26 |
| 2,622,787 | 12/1952 | Nilsson | 418/202 |
| 2,014,932 | 9/1935 | Hallett | 418/203 |

*Primary Examiner*—G. R. Simmons
*Attorney*—Jackson & Jones

[57] ABSTRACT

An electrical power generating system is disclosed which utilizes the entire amount of energy available in geothermally heated water. The power generating system comprises a source of geothermally heated water. One or more helical screw expanders are provided for receiving said geothermally heated water and utilizing the energy generated therein for driving at least one output shaft. Each helical screw expander comprises a pair of mating helical rotors rotatably mounted within a housing in a timed relationship. A generator is coupled to each output shaft for generating electricity. As the geothermally heated water flows through the expanders, the liquid drops in pressure and a portion thereof flashes to the vapor phase. The mass flow of vapor continues to increase as the pressure drops through the expanders. This increase in the mass flow of the vapor expands the chambers formed by the rotors to rotatably drive the rotors and the output shafts connected thereto.

14 Claims, 5 Drawing Figures

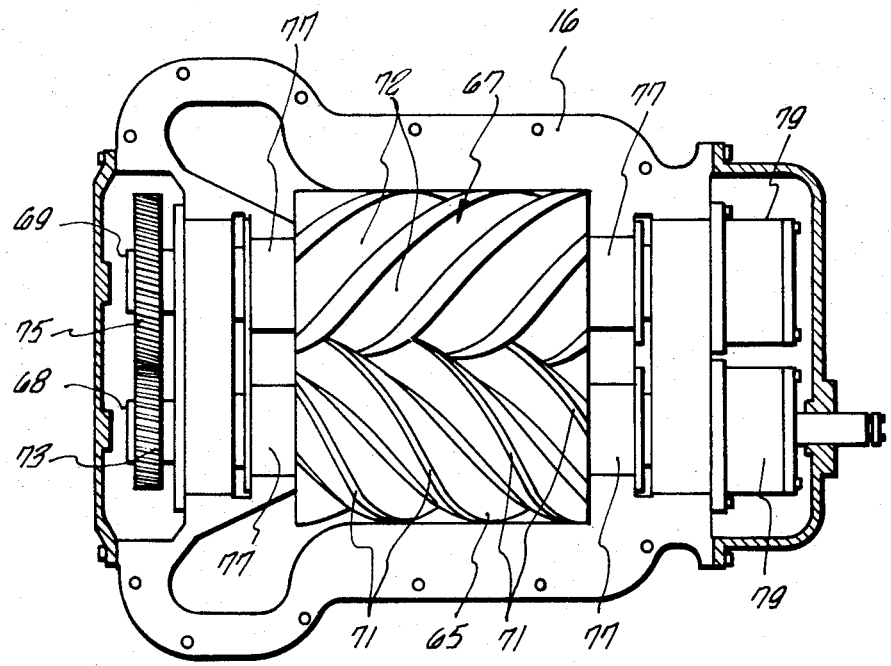
FIG_2_
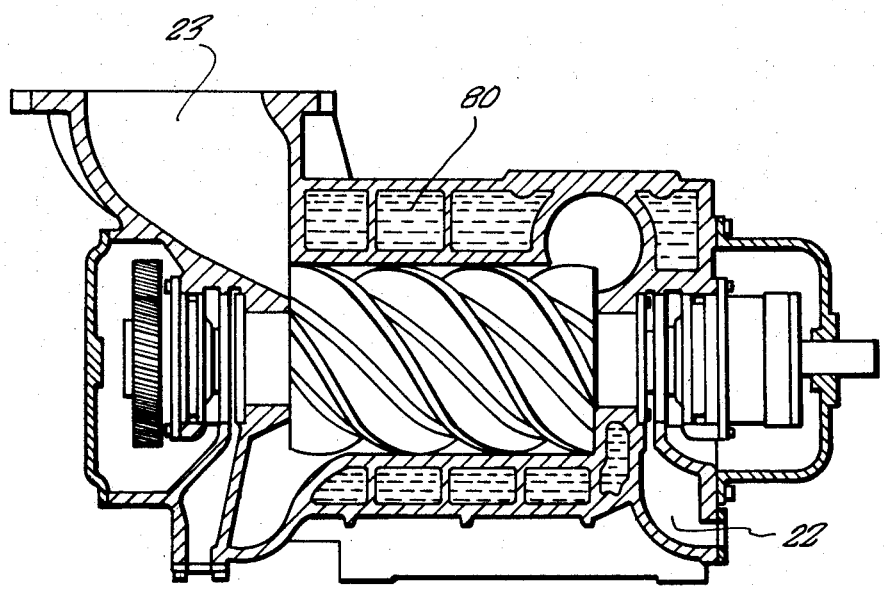
FIG_3_

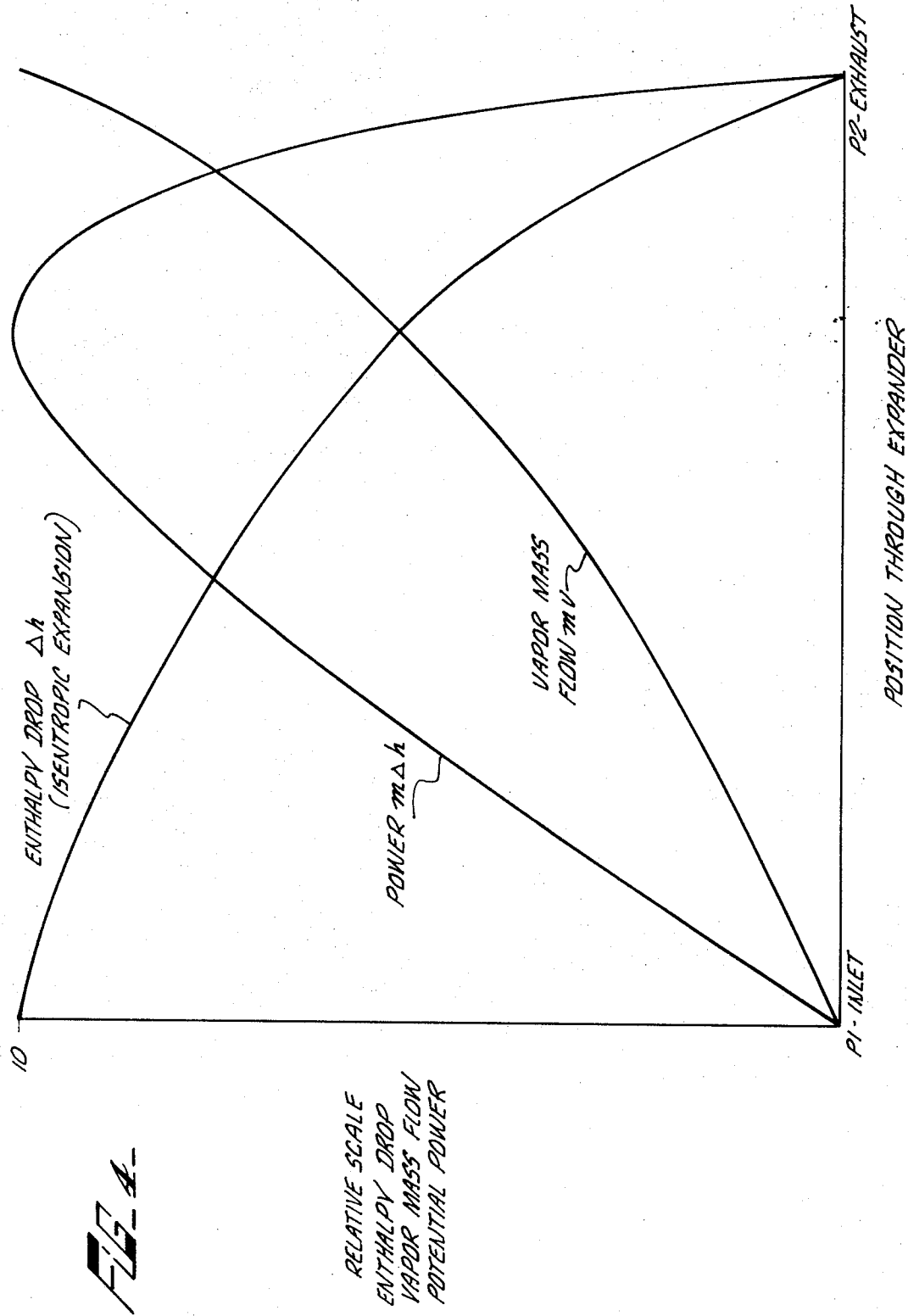

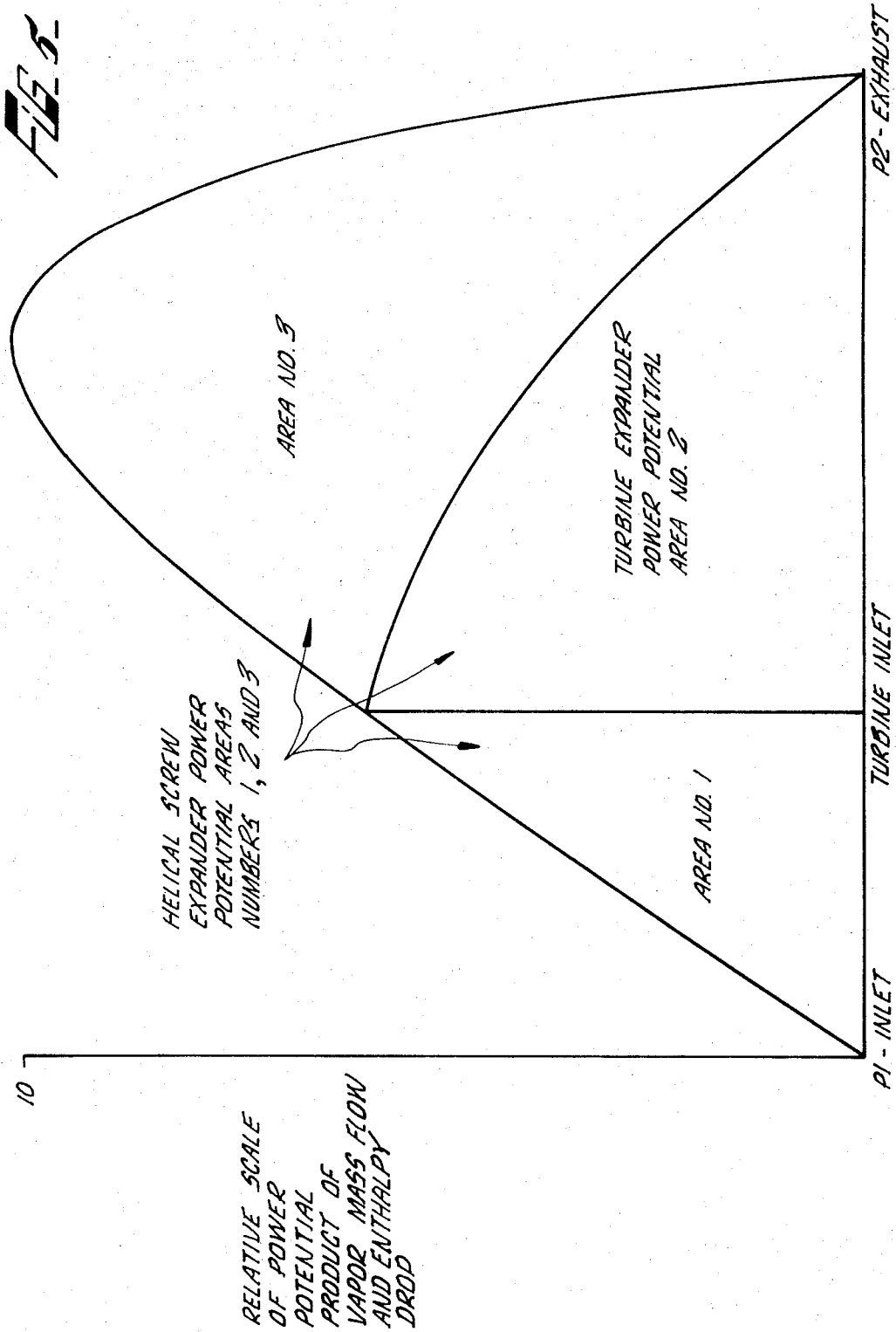

ELECTRICAL POWER GENERATING SYSTEM

BACKGROUND OF THE INVENTION

1. Field of the Invention

The present invention relates to systems for producing electrical power and more particularly to power generating systems utilizing geothermally heated water as the motive fluid.

2. Description of the Prior Art

Generating electricity geothermally is very desirable for many reasons. The primary reason is that a vast number of fumaroles or geothermal wells located in this country and throughout the world provide a seemingly unlimited supply of energy for power generating systems. Another important reason that such systems are desirable is that the fossil fuel burning power plants contribute greatly to polluting the atmosphere and raising the temperature of the surrounding environment.

The vast majority of geothermal energy available in these wells is in the form of saturated steam, most of which is hot water. Only a limited number of wells throughout the world ar fortunate enough to emit superheated, or dry steam.

The reason the term, fortunate, is used is that present day geothermal power systems utilize steam turbines as the prime mover and such turbines can only operate on dry steam. These turbines simply cannot accept large amounts of moisture, particulate matter, or dissolved solids. Because of this, present day power generating systems are required to separate the dry steam from the mixture before it can be utilized by the turbines. Although the separation and the dumping of this hot water is necessary, it is not very desirable since a vast amount of available energy is wasted. In many wells, approximately two-thirds of the available geothermal energy is in the form of water.

One proposal has been advanced for providing a system which is capable of utilizing the hot water from geothermal wells. This system utilizes the hot water to flash isobutane in a heat exchanger for propulsion of a turbine. Although this system appears to be capable of operating as proposed, the complexities and expense of adding turbo pumps, feed pumps, a heater, and boiler makes the system impractical and unattractive.

The present invention has succeeded in utilizing geothermally heated water as the motive fluid by utilizing helical screw expanders as the prime mover.

Heretofore, helical screw machines were utilized mostly as vapor compressors. Only a very small minority of such machines were used as expanders and in all of such cases, the motive fluid for these machines was in the form of a vapor. In short, prior to the present invention, no one had utilized helical screw machines (1) to operate as expanders driven by high temperature, high pressure water, and (2) to drive generators for generating electricity.

SUMMARY OF THE INVENTION

The electrical power generating system comprises a source of geothermally heated water; one or more helical screw expanders for receiving the geothermally heated water and utilizing the energy thereof for driving at least one output shaft; and a rotary generator coupled to each output shaft for generating electricity.

The primary advantage of utilizing a helical screw expander in the system is its ability to directly accept geothermally heated water thereby utilizing all of the available energy from geothermal wells.

Another advantage of utilizing the helical screw expander as the prime mover is that it is not adversely affected by mineral deposition. In fact, it has been found that the helical screw expander operates more efficiently when the clearance gaps are reduced by such depositions.

A further advantage of the helical screw expander is that its bulky and rugged construction makes it less susceptible to corrosion and erosion than a steam turbine or other types of prime movers.

Still another advantage of utilizing helical screw expanders in the system is that they are able to run efficiently over a wide range of power loads at constant speed. Besides being of prime importance to power companies in meeting fluctuations in power demand, this characteristic allows the system to be applied to a wide range of geothermal fluid inlet conditions. As a result, the system of the present invention can operate efficiently in any number of different geothermal locations having different pressures, temperatures and flow conditions.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 2 is a sectional view of a helical screw expander utilized in the power generating system of the present invention;

FIG. 3 is a sectional view of the helical screw expander taken along lines 3—3 of FIG. 2;

FIG. 4 is a graph illustrating various operating characteristics of the system utilizing a helical screw expander; and FIG. 5 is a graph comparing the amount of potentially available energy utilized by the system using a helical screw expander and that of a system utilizing a steam turbine.

DESCRIPTION OF THE PREFERRED EMBODIMENT

Figure 1:
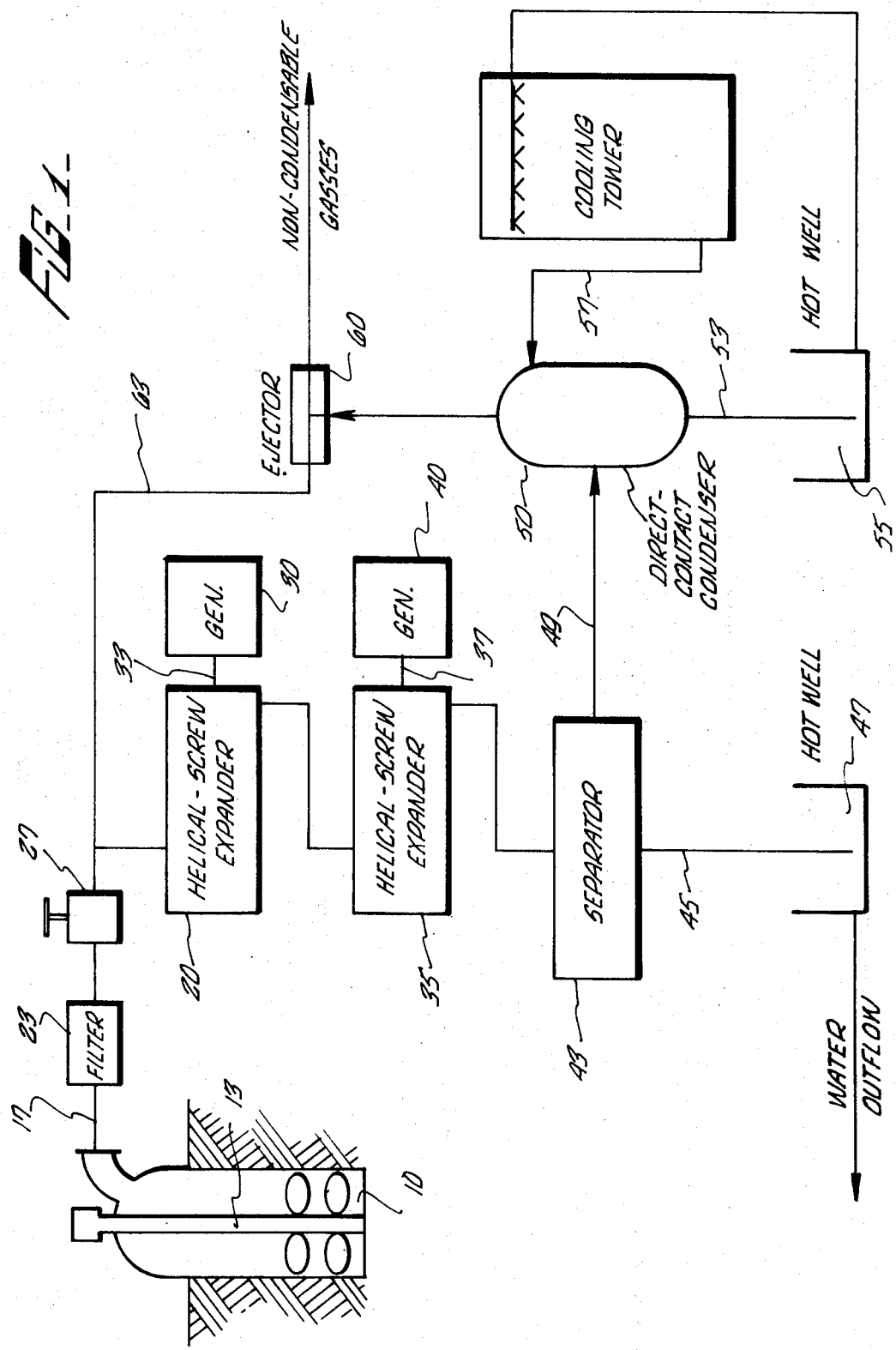
FIG. 1 is a schematic view of the electrical power generating system of the present invention.

Referring now to the drawings, FIG. 1 illustrates an electrical power generating system comprising a source of geothermally heated water 10, in the form of a fumarole. Such fumaroles are found in many countries throughout the world and particularly in the western region of the United States. A pump 13 is located within the fumarole 10 and conventionally comprises a plurality of axial flow impellers which function to pump the geothermally heated water through a conduit 17 to a first helical screw expander 20. A filter 23 is positioned within the conduit 17 for separating and collecting particulate matter from the geothermally heated water. A gate valve 27 is also provided within the conduit 17 for controlling the flow of geothermally heated water entering the first helical screw expander 20.

A first rotary generator 30 is coupled, through an output shaft 33, to the first helical screw expander 20 for generating electricity.

A second helical screw expander 35 is connected in series communication with the motive fluid. The second helical expander 35 includes an output shaft 37 for coupling to a second rotary generator 40.

This portion of the power generating system of the present invention operates as follows. The entire flow from the well 10 is kept under pressure to prevent its flashing into steam. The normal condition for the saturated liquid is 100 psia and approximately 325° F. After the particulate matter of a predetermined size has been separated by the filter from the liquid, the liquid passed through the control valve 27 into the first helical screw expander 20. As the liquid enters the expander 20, it drops in pressure and a small portion of it flashes to the vapor phase. As the pressure continues to drop, the mass flow of vapor continues to increase. This increase in mass flow of vapor is the medium for driving the expander 20.

For sake of example, the outlet condition for the first stage of the system is 50 psia and approximately 280° F. At this point, approximately 95 percent of the mixture is saturated liquid and 5 percent thereof is vapor. It should be noted, however, that these conditions will depend on the particular size of the expander and will vary accordingly.

This mixture then enters the second helical expander 35 with the vapor mass flow continuing to increase to drive the expander 35. The outlet condition for the second expander 35, again for sake of example, is usually 2 psia at approximately 120° F. At this time the mixture of the motive fluid is 85 percent saturated liquid and 15 percent vapor. As previously described, the generators 30 and 40 are coupled to the respective expanders 20 and 35 to be rotatably driven thereby for generating electricity. It should be noted that any number or sizes of helical screw expanders can be utilized in the system. Likewise, any number of generators can be coupled either to a common output shaft or to the respective individual output shafts.

The mixture exiting from the second stage expander 35 is then preferably fed into a separator 43. The function of the separator 43 is (1) to operate under vacuum to lower the exhaust pressure of the second expander stage thereby increasing the work output, and (2) to separate the liquid from the vapor for having the vapor condensed to a liquid state.

After separation, the liquid exits the separator 43 through a conduit 45 to a hot well 47. The vapor exits the separator 43 through a conduit 49 to a direct-contact condenser 50. The condenser 50 operates in a conventional manner to contact the vapor with a spray of cooling liquid to absorb and condense the vapor. This condensed vapor exits through a conduit 53 to a hot well 55. Liquid from this hot well 55 is fed at 120° F into a cooling tower heat exchanger which functions in a conventional manner to lower the temperature of the liquid to approximately 80° F. This cooled liquid is then fed through a conduit 57 into the condenser 50 to function as described previously.

The non-condensable vapors are collected from the condenser 50 and evacuated therefrom by means of an ejector 60 which is operated by a portion of the motive fluid which is fed therethrough by a conduit 63.

FIGS. 2 and 3 show an intermeshing plural rotor helical screw expander used as the prime movers 20 and 35 in the power generating system. Each expander comprises a pair of intermeshing helical rotors 65 and 67 rotatably mounted on a pair of shafts 68 and 69 within the housing 70.

The male rotor 65 is comprised of four helically wound lobes 71 which are adapted to extend into six flutes 72 formed in the female rotor 65.

A pair of timing gears 73 and 75 are connected to the extremities of the shafts 68 and 69 and are interengaged to synchronize the rotational speeds of the rotors 65 and 67. The diameters of the gears 73 and 75 are of a size to enable the male rotor 65 to rotate 50 percent faster than the female rotor 67. It should also be noted that the rotors 65 and 67 do not engage in a binding sense during rotation.

The housing 16 is also provided with an inlet 22 extending into the one end of the rotor chamber 15 and an exhaust 23 extending into the other end thereof.

Suitable shaft and thrust bearings 77 and 79 are provided to adequately support the rotors 65 and 67 within the housing 70. Moreover, a water jacket 80 is provided within the housing 70 to extend around the rotor chamber for cooling purposes. At the motive fluid enters the inlet 83, pockets formed between the rotors and the casing wall begin to form. As the rotors 65 and 67 turn, these pockets are further separated and increase in volume permitting the motive fluid to expand. As stated above, the helical screw expander is capable of accepting geothermally heated water and expand directly the steam that is continuously being produced therefrom as the water decreases in pressure through the machine. Thus, as the mass flow of steam increases as the pressure drops through the expander, the energy is fully utilized and not wasted.

Although the system is provided with a filter 23, the helical screw expanders 20 and 35 are capable of ingesting a wide range of particle sizes. As a rule, the harder the particle, the closer its diameter should be to the rotor-to-housing clearance gap. Softer particles like silica and calcium deposits cause no problem. In fact, it has been found that not only is mineral deposition not a problem, it is benefical to the operation of the expander. The efficiency of a helical screw expander is dependent upon the clearance volume, i.e., the rotor-to-rotor and rotor-to-housing clearance or gap. With mineral deposition occurring, the rotors lap themselves in and continually scrape away excess deposit. It has been found that the scars left by large solid particles being ingested actually fill in with mineral deposits. As a result, the machine is self-healing.

Since the helical screw expander is a positive displacement machine, it is able to run efficiently over a wide range of power loads at constant speed. Besides meeting the fluctuations in power demand, the system can be applied to a wide range of geothermal fluid inlet conditions. Thus, one system can efficiently cover a multitude of different geothermal locations having different pressures, temperatures and flow conditions.

FIG. 4 shows more clearly how the system using helical screw expanders utilize the mass flow increase in vapor. Each point on the graph corresponds to a particular position or pressure within the expanders. As the liquid enters the machine and drops in pressure, a fraction thereof flashes to a vapor phase. As the pressure continues to drop, the mass flow of vapor increases. Similarly the enthalpy drop, the drop between any particular position and the exhaust enthalpy is represented on the graph. By taking the product of the mass flow and the enthalpy drop, a curve is produced where the area under the curve represents the power potential available.

In contrast, a turbine installation on the same fluid input must first reduce the pressure to an optimum point where the flashed steam is separated. Then only this fixed amount of steam is utilized. As a result, the amount of the power potential utilized by the turbine is shown in FIG. 5. This amount is approximately one third of the full potential energy utilized by the helical screw installation.

In summary, the power generating system of the present invention has unique qualities which enable the efficient use of geothermal energy. The system is simple, low in maintenance and long lived, all the preferred qualities of a successful operation.

It should be noted that various modifications can be made to the apparatus while still remaining within the purview of the following claims.

What is claimed is:

1. A method of generating electrical power comprising the steps of:
   providing a constant supply of geothermally heated fluid including as a significant portion thereof water in a substantially saturated liquid state at a given temperature and pressure;
   supplying said fluid to an intermeshing plural rotor helical screw expander having an output shaft which rotates when a fluid is expanded therethrough;
   expanding said fluid within said expander to a pressure and temperature so that a portion of said water flashes into a vapor phase within the expander; and
   coupling the output shaft of the expander to a generator for generating electricity.

2. An electrical power generating system comprising:
   a source of geothermally heated fluid including as a significant portion thereof water in a substantially saturated liquid state at a first pressure and temperature;
   a helical screw expander having plural intermeshing rotors and an output shaft which rotates when a fluid is expanded therethrough;
   means for expanding said geothermally heated fluid through said expander to a second pressure and temperature so that a portion of said water flashes into a vapor phase within the expander; and
   means coupled to the output shaft of said expander for generating electricity.

3. The invention of claim 2 wherein the geothermally heated fluid comprises water as a major portion thereof.

4. The invention of claim 2 further including filter means for removing at least a portion of any particulate material from the geothermal fluid before it is introduced to the helical screw expander; a second helical screw expander; means for fluidly connecting the exhausted geothermal fluid from the first helical screw expander to the intake of the second helical screw expander and means coupled to the second helical screw expander for generating electricity.

5. The invention of claim 2 wherein said helical screw expander further comprises two interengaging timing gears, each connected to a respective rotor, for controlling the respective rotational speeds of the rotors.

6. The invention of claim 2 wherein said power generating system further comprises means for condensing the steam generated with the helical screw expander and exhausting through the motive fluid outlet.

7. The invention of claim 6 wherein said condensing means comprises:
   means for separating the vapor from the liquid exhausting from said helical screw expander; and
   means for contacting the vapor with a supply of relatively cool water.

8. The invention of claim 7 wherein said condensing means further comprises heat exchange means for cooling the liquid exiting from said separating means or from the contacting means and injecting said cooled liquid into said contacting means.

9. The invention of claim 7 further comprising vacuum means for evacuating the non-condensable vapors from said contacting means.

10. The invention of claim 2 wherein said means for supplying said geothermally heated water comprises:
    a well pump located within said source of geothermally heated water; and
    conduit means communicating with said well pump and the motive fluid inlet of said helical screw expander.

11. The invention of claim 10 further comprising filter means located within said conduit means for separating particulate matter from said geothermally heated water.

12. A method of generating electrical power comprising the steps of:
    providing a constant supply of geothermally heated homogenous fluid comprising as a major portion thereof water in a saturated liquid state at a given temperature and pressure;
    supplying said fluid to a fluid inlet of a helical screw expander, having plural intermeshing rotors the expander having a fluid outlet and an output shaft which rotates when a fluid is expanded therein between the inlet and outlet;
    providing an exhaust pressure and temperature at the expander outlet, so that a portion of the water flashes into a vapor phase within the expander, the exhaust pressure and temperature being lower than the given pressure and temperture; and
    coupling the output shaft of the expander to a generator for generating electricity.

13. The method as defined in claim 12 wherein the given pressure exceeds 50 psia and the temperature exceeds 280° F.

14. The method as defined in claim 12 wherein the fluid supplied to the helical screw expander inlet is at least 85 percent saturated liquid.

* * * * *